(12) United States Patent
Mulholland

(10) Patent No.: US 6,258,884 B1
(45) Date of Patent: *Jul. 10, 2001

(54) POLYMERIC ACETALS RESISTANT TO MINERAL DEPOSITION

(75) Inventor: Bruce Mulholland, Hebron, KY (US)

(73) Assignee: Hoechst Celanese Corporation, Somerville, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/035,832

(22) Filed: Mar. 23, 1993

Related U.S. Application Data

(63) Continuation of application No. 07/812,594, filed on Dec. 23, 1991, now abandoned.

(51) Int. Cl.[7] .................. C08K 3/30; C08L 59/00
(52) U.S. Cl. ............... 524/420; 524/432; 524/439; 524/593; 524/366; 525/327.3
(58) Field of Search ..................... 524/420, 432, 524/439, 593; 525/398

(56) References Cited

U.S. PATENT DOCUMENTS

| | | | | |
|---|---|---|---|---|
| 4,517,319 | * | 5/1985 | Reske et al. | 524/432 |
| 4,760,119 | * | 7/1988 | Liotta et al. | 525/398 |
| 4,942,208 | * | 7/1990 | Forschirm et al. | 525/398 |

FOREIGN PATENT DOCUMENTS

231122 * 8/1987 (EP) .

* cited by examiner

Primary Examiner—James J. Seidleck
Assistant Examiner—Olga Asinovsky
(74) Attorney, Agent, or Firm—James A. Jubinsky

(57) ABSTRACT

Polymeric compositions characterized by containing polymeric acetals and zinc-containing inorganic fillers exhibiting improved resistance to the formation and adhesion of mineral deposits when used in applications wherein the composition is exposed to water containing dissolved minerals for extended periods of time. The composition may be prepared into shaped articles which are useful as mineral resistant, plumbing fixtures.

20 Claims, No Drawings

POLYMERIC ACETALS RESISTANT TO MINERAL DEPOSITION

This is a continuation of application Ser. No. 07/812,594 filed on Dec. 23, 1991 abandoned.

FIELD OF THE INVENTION

The present invention relates generally to the field of polymers, and more specifically to polymers that resist mineral deposition in aqueous environments.

BACKGROUND OF THE INVENTION

Polymeric acetal resins (polyacetals) are resistant to degradation in aqueous environments and are therefore useful in applications in which the polymer is in contact with water for extended periods of time. Polyacetals also have excellent physical and mechanical properties. This combination of properties makes polyacetals particularly useful in plumbing application, such as water faucets and showerheads.

A problem that is encountered with essentially all materials when used in plumbing fixtures is the accumulation of mineral deposits. This problem occurs with metals as well as plastics. The problem is especially noticeable in showerheads, where large volumes of water pass through small openings at elevated temperatures. The mineral build-up is generally more noticeable when "hard" water is used (i.e. water with a high mineral content) and is often a problem in rural areas which rely on wells for water. This mineral accumulation results in unsightly deposits, and in some instances, such as showerheads, the accumulated minerals can eventually interfere with the operation of the plumbing fixture. If a material can be found which resists the accumulation and adhesion of such mineral deposits, certain plumbing fixtures, such as showerheads, could be designed with a longer useful life.

Inorganic fillers are often included in polymeric acetals and other polymers to modify the physical properties according to the particular end use. However, it does not appear that practitioners in the art have recognized that certain inorganic fillers improve the resistance of specific polymers to the build-up and adhesion of mineral deposits.

SUMMARY OF THE INVENTION

Compositions have now been discovered which resist the build-up and adhesion of mineral deposits in aqueous environments containing dissolved minerals. These compositions comprise a polymeric acetal and a sufficient quantity of a zinc-containing inorganic filler to give the composition resistance to the build-up and adhesion of mineral deposits. The zinc-containing inorganic filler can be included at a level of about 1% to about 20% by weight, more preferably at a level of about 5% to about 10% by weight, and most preferably at a level of about 7.5% by weight.

Zinc oxide and zinc sulfide are the preferred zinc-containing inorganic fillers, with zinc oxide being most preferred. The composition can also include other additives such as mold lubricants, plasticizers, fillers, glass fibers, nucleating agents, antioxidants, formaldehyde scavengers, chain scission inhibitors, ultraviolet light inhibitors, impact modifiers, acid scavengers, and colorants. A method is also disclosed for making shaped articles which resist the deposition of minerals. The method consists of the steps of first making a blend of polyacetal, zinc-containing inorganic filler, and other optional additives such as those listed above; and second, shaping the blend to form the desired article.

DETAILED DESCRIPTION OF THE INVENTION

The composition of the current invention is a blend comprising a polymeric acetal and a zinc-containing inorganic filler. Polymeric acetals are characterized in general as having recurring oxymethylene repeat units of the following formula:

Polymeric acetals that are useful in making composition of the current invention generally have a fairly high content of oxymethylene units (generally greater that about 85%). These materials are commercially available from a number of manufacturers as homopolymers, copolymers, terpolymers, and the like. These highly crystalline acetals, described briefly hereinbelow, are well known in the art and have been reviewed extensively. For example, a review of polymeric acetals entitled "Acetal Resins," by T. J. Dolce and J. A. Grates, can be found in the Second Edition of *Encyclopedia of Polymer Science a Engineering*, John Wiley and Sons, New York, 1985, Vol. 1, pp.42–61. Additional information on acetal copolymers can be found as part of the Detailed Description in commonly assigned U.S. Pat. No. 4,788,258.

Typically, acetal homopolymers, or poly(oxymethylenes), are prepared by polymerizing anhydrous formaldehyde or trioxane. Oxymethylene homopolymers and usually stabilized against thermal degradation by end-capping with, for example, ester or ether groups, such as those derived from alkanoic anhydrides (e.g. acetic anhydride) or dialkyl ethers, (e.g. dimethyl ether), or by incorporating stabilizer compounds into the homopolymer. Commercially available acetal homopolymer is made by polymerizing anhydrous formaldehyde in the presence of an initiator, after which the polymer is end-capped by acetylation of the hemiacetal end groups with acetic anhydride in the presence of sodium acetate catalyst. Methods for making end-capping acetal homopolymers are taught in U.S. Pat. Nos. 2,786,994 and 2,998,409. Acetal homopolymer is well know in the art and is commercially available under the trademarks DELRIN® and TENAC®.

Polymeric acetals which have been found to be especially suitable for use in the composition of the present invention are crystalline oxymethylene copolymers having repeat units which consist essentially of oxymethylene groups interspersed with oxy(higher alkylene) groups represented by the general formula:

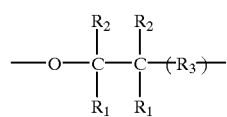

wherein each $R_1$ and $R_2$ is hydrogen, a lower alkyl group, or a halogen substituted lower alkyl group, each $R_3$ is a methylene, oxymethylene, lower alkyl or haloalkyl substituted methylene or lower alkyl or haloalkyl substituted oxymethylene group, and n is zero or an integer from one to three, inclusive. Each lower alkyl group preferably contains one or two carbon atoms. Oxymethylene groups generally will constitute from about 85 to 99.9 percent of the recurring units in such copolymers and are generally incorporated by ring-opening polymerization of trioxane in the presence of an acidic catalyst. The oxy(higher alkylene) groups are incorporated into the polymer by copolymerizing a cyclic ether or cyclic formal having at least two adjacent carbon atoms in the ring in addition to trioxane. The cyclic ether or formal is incorporated by the breaking of an oxygen-to-carbon linkage. The preferred oxy(higher alkylene) group is oxyethylene, having the formula:

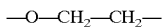

Oxyethylene is incorporated into the polymer by copolymerization of ethylene oxide or 1,3-dioxolane with trioxane.

The preferred crystalline acetal copolymers as described above, which have a structure consisting essentially of oxymethylene and oxyethylene groups, are thermoplastic materials having a melting point of at least 150° C. They normally are millable or processable at temperatures ranging from about 175° C. to about 200° C. They are normally highly crystalline, having a polymer crystallinity from about 60% to about 90% or greater.

These oxymethylene copolymers normally are stabilized after manufacture by degradation of unstable molecular ends of the polymer chains to a point where a relatively stable carbon-to-carbon linkage prevents further degradation of each end of the polymer chain. Such degradation of unstable molecular ends is generally effected by hydrolysis, as disclosed, for example, in U.S. Pat. No. 3,219,623 to Berardinelli. The oxymethylene copolymer may also be stabilized by end-capping, again using techniques well known to those skilled in the art, as for example by acetylation with acetic anhydride in the present of sodium acetate catalyst.

A particularly preferred class of oxymethylene copolymers is commercially available under the name CELCON® acetal copolymer. CELCON acetal copolymers typically are copolymers of about 98% (by weight) trioxane and about 2% ethylene oxide. CELCON is a registered trademark of Hoechst Celanese Corporation, the assignee of the present invention. CELCON polymers are widely available and are well known. The compositions of the current invention may be made using any commercial grade of CELCON acetal, including CELCON M25 acetal copolymer, which has a melt index of about 2.5 g/10 min when tested in accordance with ASTM D1238-82, CELCON M90 acetal copolymer, which has a lower molecular weight and a lower melt viscosity, and CELCON M270, which has an even lower molecular weight and melt viscosity. Acetal copolymers of similar compositions are also available from other manufacturers under several trademarks, including HOSTAFORM®, DURACON®, ULTRAFORM® and IUPITAL®.

Oxymethylene terpolymers may also be used in making blends of the present invention. These comprise oxymethylene groups, oxy-(higher alkylene) groups such as those corresponding to the above-recited general formula:

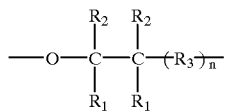

and a different third group which has been interpolymerized with the oxymethylene and oxy(higher alkylene) groups. A terpolymer as described above is typically made by reacting trioxane with a cyclic ether or cyclic acetal and with a third monomer which is a bifunctional compounds, such as a diglycide of the formula:

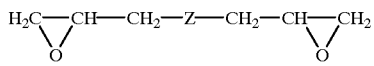

wherein Z represents a carbon-to-carbon bond, an oxygen atom, an oxyalkoxy group of 1 to 8 carbon atoms, inclusive, preferably 2 to 4 carbon atoms, an oxycycloalkoxy group of 4 to 8 carbon atoms, inclusive, or an oxypoly(lower alkoxy) group, preferably one having from 2 to 4 recurring lower alkoxy groups each with 1 or 2 carbon atoms. Examples of suitable bifunctional compounds include the diglycidyl ethers of ethylene glycol, 1,2-propanediol, and 1,4-butanediol, with the diglycidyl ether of 1,4-butanediol being preferred. Generally, when preparing such terpolymers, ratios of from 99.89 to 89.0 weight percent trioxane, 0.1 to 10 weight percent of the cyclic ether of cyclic acetal, and 0.01 to 1 weight percent of the bifunctional compound are preferred, these percentages being based on the total weight of monomers used in forming the terpolymer. A particularly preferred oxymethylene terpolymer is commercially available from Hoechst Celanese Corporation under the CELCON U10 acetal polymer, and is a terpolymer of 1,4-butanediol diglycidyl ether, ethylene oxide and trioxane containing about 0.05 weight %, 2.0 weight %, and 97.95 weight % respectively of repeating units derived from these three monomers, based on the total weight of the three monomers. The oxymethylene-based terpolymers are made and stabilized by methods well known in the art which are generally analogous to those used from making the copolymers. More detailed descriptions of the methods for making oxymethylene-based terpolymers and their compositions can be found in previously cited U.S. Pat. No. 4,788,258.

Zinc oxide and zinc sulfide are the preferred zinc-containing inorganic fillers in making compositions resistant to the build-up and adhesion of mineral deposits, with zinc oxide being most preferred. The zinc oxide can be included at any level that is sufficient to give the composition resistance to the build-up and adhesion of minerals. Thus, the level of zinc oxide can be in the range of about 1% to about 20% by weight, more preferably in the range of about 5% to about 10%, and most preferably at a level of about 7.5%.

Further, other additives may also be included in the composition in addition to the acetal polymer and the zinc-containing filler. These fillers, which are used to give other desirable properties to the composition, include mold lubricants, plasticizers, other fillers, glass fibers, nucleating agents, antioxidants, formaldehyde scavengers, chain scission inhibitors, ultraviolet light inhibitors, impact modifiers, acid scavengers, and colorants.

These compositions of polymeric acetal, zinc-containing filler and other optional additives are made by methods well known in the art. The preferred method is blending of the polymer and the additives in the melt phase of the polymer, and the additives in the melt phase of the polymer. This is readily carried out by mixing the solid polymer, the zinc-containing fillers and other optional additives, if used, in the dry state and compounding them in an extruder at a temperature above the melting point of acetal polymer, generally in the temperature range of abut 1800–220° C. Alternatively, the zinc-containing inorganic filler can be blended with an acetal polymer that already is blended with the optional additives; the final blending step is still carried out in the polymer melt phase in an extruder or other processing equipment. Prior to mixing, the acetal is preferably dried using well established methods. The extruded composition is most conveniently cooled in water and then pelletized, ground, pulverized, powdered, or otherwise processed into a form that is convenient for further fabrication. Shaped articles can be made by any of the methods commonly used to shape thermoplastic polymers, including injection molding, compression molding, extrusion, blow molding, foam molding, rotational molding, fabrication using metal-working methods, coating onto shaped articles, and combinations thereof. In general, injection molding is particularly desirable for making shaped articles using this composition.

Examples are provided hereinbelow that provide a more detailed description of the preferred embodiments of the present invention.

EXAMPLES

Example 1

The following materials were combined in sufficient quantity in a high intensity mixer to yield 55 lbs of a dry preblend with the following compositions:

CELCON M90-00 acetal copolymer, 90.45% (by weight);
ELVAMIDE concentrate (second generation), a polyamide-based formaldehyde scavenger, from DuPont, 0.75%;
IRGANOX 259, a hindered phenol-based antioxidant, from Ciba-Geigy, 0.50%;
High molecular weight crystalline acetal, used as a nucleating agent, 0.50%;
ACRAWAX C, a fatty acid amide wax used as mold lubricant, from Lonza Inc., 0.20%;
Calcium 12-hydroxystearate, 0.10%;
Zinc oxide, obtained from Whittaker, Clark and Daniels, South Plainfield, NJ, 7.5%.

These materials were first preblended in powder form, then extruded on a single screw extruder at 190° C. and 100 rpm, and finally pelletized. The pelletized product was injection molded on a reciprocating screw machine at 190° C. to yield test specimens and other shaped articles. The color of the composition described above is white. Compositions that were gray or black were also made by using the appropriate colorants.

Physical properties of the composition were measured using standard test methods and are shown in Table 1:

TABLE 1

| Physical Properties of Zinc Oxide/Polyacetal Blend | |
|---|---|
| Melt Index, gm/10 min[1] | 8.6 |
| Kd, wt %/min at 230° C.[2] | 0.015 |
| Volatiles, %[3] | 0.07 |
| Izod Impact Strength (Notched), ft-lb/in[4] | 1.26 |
| Tensile Strength, psi[5] | 8,796 |
| Elongation, %[5] | 27.6 |
| Flexural Strength, psi[6] | 12,058 |
| Flexural Modulus, psi[6] | 411,000 |

[1]ASTM D1238, condition E, at 190° C.
[2]Rate of decomposition, measured as % weight loss per minute in an oven at 230° C.
[3]Percent weight loss after heating for 3 hours at 100° C.
[4]ASTM D256
[5]ASTM D638
[6]ASTM D790

Example 2

The composition of Example 1 was molded in the shape of the plastic sprayer portion of a pulsating showerhead of the type sold by Teledyne Water Pik. These sprayers and the metal body of the showerheads were then assembled. Accelerated tests of mineral deposition were carried out using these showerhead assemblies.

The tests were performed by alternately spraying well water having sufficient mineral content to give the water a conductance of about 1000 microomh through and onto the showerhead and then drying the water from the surface of the showerhead using a hot air stream. The water had the following analysis: conductance, 1026 micromho; sulfate, 300 ppm; calcium, 62 ppm as calcium carbonate; hardness, 436 ppm as calcium carbonate; pH 6.9. The well water was typically sprayed onto the showerhead in short cycles at a temperature of about 115° F. The hot air used to evaporate the water was at a temperature of about 140° F. The air drying cycles varied from about 10 to about 30 minutes. The tests were carried out for a period of about 3 to 4 weeks.

The resistance to mineral build-up was evaluated, based on observation of the amount of accumulated mineral deposits and on how easily the deposits could be removed with a dry towel and with a wet towel. Showerheads using the composition of Example 1 were compared with showerheads made from polypropylene filled with glass beads and polypropylene filled with calcium carbonate, as well as commercial samples of the pulsating Teledyne Water Pik showerheads.

The showerheads made from the composition of Example 1 did not show distinctive, clearly visible spots, and any residual mineral build-up was easily removed with a dry towel. There was one area, however, where the mineral accumulation left a rough surface that was removable by scraping with a fingernail. For comparison, all of the other test showerheads had clearly visible spots. The spots on the showerhead made from polypropylene filled with glass beads could be removed with a dry towel only by applying pressure. The residual mineral spots could not be removed completely from other test showerheads using a dry towel. Thus, the composition of the current invention showed less visible evidence of mineral deposition (i.e. spots) in comparison with other materials, and these spots were more easily removed.

Analogous tests were also carried out in which the composition of Example 1 was compared with an ABS resin and a high impact polystirene comprising a polyphenylene oxide/polystirene blend. The composition of Example 1 exhibited better resistance to mineral deposition than either of the other polymer compositions did.

Example 3

The composition of Example 1 was molded into test plaques along with the formulations presented in Table 2. These additional samples were prepared using methods similar to those described for the preparation of Example 1.

A quantitative measure of the resistance to the build-up and adhesion of mineral deposits was determined using the following procedure. Test plaques weighing about 20 gms each were first weighed and then mounted into a carousel (ferris wheel type). Samples were repeatedly rotated through a water immersion stage of 1–2 seconds followed by rotation for about 10 seconds through blasts of hot air from a hair drier. Water used was from the same source as was used in Example 2 and was maintained at a temperature of about 140° F. Water immersion/hot air cycle rotation was continued for a period of about three weeks. Samples were allowed to dry and then weighed to give a measure of the amount of mineral build-up. Finally, samples were rinsed using a fixed spray configuration, dried, and re-weighed to yield a measure of mineral adhesion. Results are presented in Table 2 and show that inclusion of zinc compounds improves the resistance to mineral build-up and adhesion compared with acetal control resin. The resistance to build-up and adhesion of minerals also appears to increase with the amount of ZnO.

TABLE 2

| Amount and Composition of Filler in Acetal | Deposit Weight (grams) | Mineral Remaining After Rinse (grams) |
|---|---|---|
| 2.0% ZnS | 0.0429 | 0.0373 |
| 2.0% ZnO | 0.0420 | 0.0340 |
| 4.5% ZnO | 0.0357 | 0.0302 |
| 7.5% ZnO | 0.0369 | 0.0270 |
| None (Control) | 0.0418 | 0.0369 |

It is to be understood that the above-described embodiments of the invention are illustrative only and that modification throughout may occur to one skilled in the art. Accordingly, this invention is not to be regarded as limited the embodiments disclosed herein.

What is claimed is:

1. A method for reducing water mineral deposits on a shaped article comprising the steps of: (a) making a blend c comprising a polymeric acetal and a zinc-containing inorganic filler; (b) shaping said blend to form a shaped article; and (c) h contacting said shaped article with water containing minerals; wherein said blend comprises about 1% to about 20% by weight of said zinc-containing inorganic filler.

2. The method of claim 1 wherein said zinc-containing inorganic filler is zinc oxide.

3. The method of claim 1 wherein said zinc-containing inorganic filler is zinc sulfide.

4. The method of claim 1 wherein said blend comprises about 5% to about 10% by weight of said zinc-containing inorganic filler.

5. The method of claim 4 wherein said zinc-containing inorganic filler is zinc oxide.

6. The method of claim 4 wherein said zinc-containing inorganic filler is zinc sulfide.

7. The method according to claim 1, wherein the polymeric acetal is selected from the group consisting of:

a) oxymethylene homopolymers;
b) oxymethylene copolymers comprising about 85 to about 99.9 percent oxymethylene repeating units interspersed with repeat units of the formula:

$$-O-\underset{\underset{R_1}{|}}{\overset{\overset{R_2}{|}}{C}}-\underset{\underset{R_1}{|}}{\overset{\overset{R_2}{|}}{C}}-(R_3)_n-$$

wherein each $R_1$ and $R_2$ is selected from the group consisting of hydrogen, lower alkyl radicals and halogen-substituted lower alkyl radicals, said lower alkyl radicals each having from 1 to 2 carbon atoms, each $R_3$ is selected from methylene, oxymethylene, lower alkyl and haloalkyl-substituted methylene, and lower alkyl and haloalkyl-substituted oxymethylene radicals, and n is an integer from 0 to 3, inclusive; and c) oxymethylene terpolymers, which is the reaction product of trioxane, a cyclic ether and/or a cyclic acetal, and a diglycidyl ether of the formula:

$$H_2C-CH-CH_2-Z-CH_2-CH-CH_2$$
$$\underset{O}{\diagdown\diagup} \qquad \underset{O}{\diagdown\diagup}$$

wherein Z is selected from the group consisting of a carbon-to-carbon bond, oxygen, an oxyalkoxy unit of 1 to 8 carbon, an oxycycloalkoxy unit of 4 to 8 carbon atoms, and an oxypoly(lower alkoxy) unit.

8. The method according to claim 1, wherein the polymeric acetal is selected from the group consisting of:

a) end-capped oxymethylene homopolymer;
b) oxymethylene copolymer comprising about 85 to about 99.9 percent oxymethylene repeat units and about 0.1 to about, 15 percent oxyethylene repeat units; and
c) oxymethylene terpolymer, which is the reaction product of trioxane, 1,4-butanediol diglycidyl ether, and a cyclic ether selected from the group consisting of ethylene oxide, 1,3-dioxoland and mixtures thereof.

9. The method according to claim 1, further comprising one or more additives selected from the group consisting of mold lubricants, plasticizers, fillers, glass fibers, nucleating agents, antioxidants, formaldehyde scavengers, chain scission inhibitors, impact modifiers, acid scavengers, and colorants.

10. The method according to claim 1, wherein step (b) of shaping the blend is performed according to a method selected from the group consisting of injection molding, compression molding, extrusion, blow molding, foam molding, rotational molding, fabrication using metalworking methods, coating into a second shaped article, and combinations thereof.

11. The method of claim 8 wherein said oxymethylene copolymer is about 98% by weight oxymethylene and about 2% by weight oxyethylene.

12. The method of claim 8 wherein said oxymethylene terpolymer is about 0.05% by weight 1,4-butanediol diglycidyl ether, about 2% by weight ethylene oxide and about 97.05% by weight oxymethylene.

13. The method of claim 1 wherein said shaped article is a plumbing fixture.

14. The method of claim 13 wherein said plumbing fixture is a showerhead.

15. A method for reducing water mineral deposits on a shaped article comprising the steps of: (a) making a blend comprising a polymeric acetal and a zinc-containing inorganic filler; (b) shaping said blend to form a shaped article; and (c) contacting said shaped article with water containing minerals; wherein the amount of said zinc-containing inorganic filler is in sufficient quantity to reduce the amount of mineral deposits by at least about 8%.

16. The method of claim 15 wherein said amount of said zinc-containing inorganic filler is in sufficient quantity to reduce the amount of mineral deposits by at least about 18%.

17. The method of claim 15 wherein said zinc-containing inorganic filler is zinc oxide.

18. A composition consisting of a polymeric acetal and zinc sulfide in an amount from about 1 to about 20% by weight, which exhibits resistances to the build-up and adhesion of mineral deposits.

19. The composition of claim 18 wherein the amount of said zinc sulfide is in an amount of from about 5 to about 10%.

20. The composition of claim 18, wherein the polymeric acetal is selected from the group consisting of:

a) oxymethylene homopolymers;
b) oxymethylene copolymers comprising about 85 to about 99.9 percent oxymethylene repeating units interspersed with repeat units of the formula:

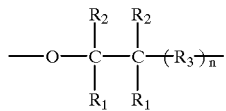

wherein each $R_1$ and $R_2$ is selected from the group consisting of hydrogen, lower alkyl radicals and halogen-substituted lower alkyl radicals, said lower alkyl radicals each having from 1 to 2 carbon atoms, each $R_3$ is selected from methylene, oxymethylene, lower alkyl and haloalkyl-substituted methylene, and lower alkyl and haloalkyl-substituted oxymethylene radicals, and n is an integer from o to 3, inclusive; and c) oxymethylene terpolymers, which is the reaction product of trioxane, a cyclic ether and/or a cyclic acetal, and a diglycidyl ether of the formula:

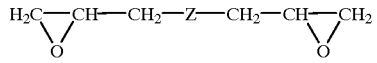

wherein Z is selected from the group consisting of a carbon-to-carbon bond, oxygen, an oxyalkoxy unit of 1 to 8 carbon, an oxycycloalkoxy unit of 4 to 8 carbon atoms, and an oxypoly(lower alkoxy) unit.

* * * * *